UNITED STATES PATENT OFFICE.

CHARLES MOUREU, OF PARIS, FRANCE.

ACETYLENE CARBONIC-ACID DERIVATIVE.

No. 843,289.     Specification of Letters Patent.     Patented Feb. 5, 1907.

Original application filed August 4, 1902, Serial No. 118,392. Divided and this application filed June 27, 1905. Serial No. 267,290.

*To all whom it may concern:*

Be it known that I, CHARLES MOUREU, of Paris, France, have invented a new and useful Improvement in Acetylene Carbonic-Acid Derivatives, which invention is fully set forth in the following specification.

In my United States Patent No. 749,800, dated January 19, 1904, I have claimed the acids issuing from N. heptin 1 and N. octin 1, and in my United States Patents Nos. 750,212 and 750,213 of the same date the ethers derived from these acids as useful for technical purposes. Since taking out these patents I have made the following observations, which improve or perfect my previous invention and which constitutes the subject of my application, Serial No. 118,392, filed August 4, 1902, of which this application is a division. I have found that instead of starting from the sodium derivatives of the N. heptin 1 or N. octin 1 of the original patent a similar technical effect can be obtained by treating the sodium derivatives of the neighboring hydrocarbons with carbon dioxid. In this way carboxylic acids of the acetylene family are obtained, which are closely related (homologous) to the amyl and hexyl propiolic acid. The ethers of these new acids prepared by the well-known methods of etherification have a more or less pronounced odor, resembling that of the ethers of the amyl and hexyl propiolic acids, which makes them useful in perfumery and similar industries.

The hydrocarbons used for the treatment with sodium are well-known substances, the most of them prepared from the corresponding ketones. The action of the sodium usually takes place in the way described in my original application, Serial No. 68,944. In case of a slow action of the sodium the sodium derivative can be obtained quicker by heating the hydrocarbon with the sodium to its boiling-point.

In order that the compounds herein referred to may be expressed in clear, concise, and exact terms, the nomenclature adopted by the Geneva International Congress of 1892 has been followed as nearly as possible. The rules of the system have been published in the *Berichte*, Vol. 26, (1893,) page 1595 and following. For instance, the organic compound

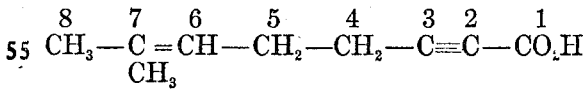

is named "methyl-7-octene-6-ine-2-oic-1" or "-acid-1," which means that a hydrocarbon of the ethylene series (octene) is substituted on its seventh carbon atom by methyl has an acetylene group on place 2 and a carboxylic or acid group on the first place. For brevity the name of the hydrocarbon is prefixed to the first designating termination only, as in "oct-ene," and omitted before the terminations that follow.

I will now proceed to give as an example the transforming of the methyl-6-heptene-5-ine-1 into the acid methyl-7-octene-6-ine-2-oic-1. This hydrocarbon has been prepared first by Grignard from the methylheptenon. (*Bull. Soc. Chim.*, 3, 21, 576, Beilstein, Suppl. Vol. I, page 31.) The hydrocarbon well dried (for example, upon melted potash) is dissolved, if necessary, in a suitable solvent, and there is added for each molecule of the hydrocarbon an atom (or slightly more) of sodium as finely divided as possible. The reaction is allowed to take place by itself and is completed, if necessary, at a strong heat in autoclave. (120°–150°.) Into the product thus obtained and which it is unnecessary to separate from the solvent a current of carbonic acid previously dried is caused to pass for a sufficient time to transform the sodium derivative into the sodium salt of the new acid above described. If care be taken to avoid loss of solvent by evaporation, the end of the reaction may be ascertained by the increase of weight. The product of this reaction is allowed to drop little by little into water, so as to dissolve the sodium salt and, on the other hand, to destroy any small amount of sodium which may have taken part in the reaction. The alkaline solution is then decanted off and washed with a suitable solvent, (ether, for example.) It is then acidulated with a light excess of strong acid, (for example, sulfuric acid.) In this way the new acid is set at liberty in the form of an oil which floats upon the surface of the liquid. The product is extracted several times with ether, (or other suitable solvent,) the ethereal liquors are united, washed with water to remove any acidity of sulfuric acid, and the ethereal solution is dried as well as possible by chlorid of calcium or any other analogous drying agent. The ether is separated by distillation and the residue purified by fractional distillation *in vacuo*.

The ethers of this acid can be prepared directly by the known etherification process— for example, by simply heating the alcohol with the acid or through the intermedia of an etherifying agent, such as sulfuric acid. In this way I have prepared, by starting from the methyl-6-heptene-5-ine-1, the acid methyl-7-octene-6-ine-2-oic-1

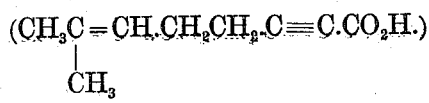

from the methyl-6-heptene-3-ine-1 the acid methyl-7-octene-4-ine-2-oic-1

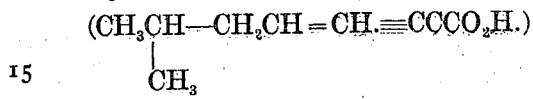

These acids and their ethers are oily, colorless, or yellowish liquids, almost insoluble in water, soluble in alcohol, ether, benzol, and gasolene. They posess the following qualities:

|  | Boiling-point. | Pressure. |
| --- | --- | --- |
| Methyl-7-octene-6-ine-2-oic-1 | 157–159° | 18–20 mm. |
| Its methylic ether | 115–125° | 20–25 mm. |
| Its ethylic ether | 125–135° | 16–18 mm. |
| Methyl-7-octene-4-ine-2-oic-1 | 153–158° | 17–19 mm. |
| Its methylic ether | 121–125° | 21–23 mm. |

What I claim is—

1. As new bodies, the above-described ethers of methyl-7-octene-6-ine-2-oic-1 acid, the said ethers being oily, practically colorless transparent liquids of a more or less pronounced aroma, lighter than water, almost insoluble in same, easily soluble in alcohol, ether, benzol and gasolene, and having boiling-points 115°–135° centigrade under twenty millimeters pressure.

2. As a new body, the above-described methylic ether of methyl-7-octene-6-ine-2-oic-1 acid, said ether being an oily, practically colorless transparent liquid of an agreeable aroma, having its boiling-point 115°–125° centigrade under 20–25 millimeters pressure, and being lighter than water, almost insoluble in same, easily soluble in alcohol, ether, benzol and gasolene.

In testimony whereof I have signed this specification in the presence of two subscribing witnesses.

CHARLES MOUREU.

Witnesses:
JULES ARMENGAUD, Jeune,
HANSON C. COXE.